(12) United States Patent
Kuznetsov et al.

(10) Patent No.: US 10,514,573 B2
(45) Date of Patent: Dec. 24, 2019

(54) DEVICE AND ARRANGEMENT FOR CONTROLLING AN ELECTROMAGNETIC WAVE, METHODS OF FORMING AND OPERATING THE SAME

(71) Applicant: Agency for Science, Technology and Research, Singapore (SG)

(72) Inventors: Arseniy Kuznetsov, Singapore (SG); Ramon Jose Paniagua Dominguez, Singapore (SG)

(73) Assignee: Agency for Science, Technology and Research, Singapore (SG)

(*) Notice: Subject to any disclaimer, the term of this patent is extended or adjusted under 35 U.S.C. 154(b) by 3 days.

(21) Appl. No.: 16/075,261

(22) PCT Filed: Jan. 19, 2017

(86) PCT No.: PCT/SG2017/050031
§ 371 (c)(1),
(2) Date: Aug. 3, 2018

(87) PCT Pub. No.: WO2017/135890
PCT Pub. Date: Aug. 10, 2017

(65) Prior Publication Data
US 2019/0049788 A1    Feb. 14, 2019

(30) Foreign Application Priority Data

Feb. 5, 2016  (SG) .......................... 10201600943U

(51) Int. Cl.
*G02F 1/1335* (2006.01)
*G09G 3/36* (2006.01)

(52) U.S. Cl.
CPC .. *G02F 1/133528* (2013.01); *G02F 1/133509* (2013.01); *G02F 1/133514* (2013.01);
(Continued)

(58) Field of Classification Search
CPC ......... G02F 1/133509; G02F 1/133514; G02F 1/133528; G02F 2001/133565;
(Continued)

(56) References Cited

U.S. PATENT DOCUMENTS

| 6,366,254 B1* | 4/2002 | Sievenpiper | ......... H01Q 1/3275 |
| | | | 343/770 |
| 9,290,855 B2* | 3/2016 | Worsley | .................... C25D 5/10 |

(Continued)

FOREIGN PATENT DOCUMENTS

| CN | 104049424 A | 9/2014 |
| WO | 2015077127 A1 | 5/2015 |

OTHER PUBLICATIONS

Yu et al., "Light Propagation with Phase Discontinuities: Generalized Laws of Reflection and Refraction," Science, vol. 334, Oct. 21, 2011, pp. 333-337.
(Continued)

*Primary Examiner* — Hoan C Nguyen
(74) *Attorney, Agent, or Firm* — Winstead PC

(57) ABSTRACT

Various embodiments may provide a device for controlling an electromagnetic wave. The device may include a first electrode layer. The device may also include a second electrode layer. The device may further include a matrix layer between the first electrode layer and the second electrode layer. The matrix layer may include a liquid crystal layer. The matrix layer may also include at least one resonator element in contact with the liquid crystal layer. The liquid crystal layer may be configured to switch from, at least, a first state to a second state in response to a voltage applied between the first electrode layer and the second electrode layer, thereby changing an optical property of the matrix layer to control the electromagnetic wave received by the matrix layer.

20 Claims, 19 Drawing Sheets

(52) U.S. Cl.
CPC ... *G09G 3/36* (2013.01); *G02F 2001/133521* (2013.01); *G02F 2001/133565* (2013.01); *G02F 2202/36* (2013.01); *G02F 2203/15* (2013.01)

(58) Field of Classification Search
CPC ..... G02F 2202/36; G02F 2001/133521; G02F 2203/15; G09G 3/36
See application file for complete search history.

(56) References Cited

U.S. PATENT DOCUMENTS

| | | | |
|---|---|---|---|
| 9,453,289 B2* | 9/2016 | Rose | C25D 13/12 |
| 2013/0314765 A1* | 11/2013 | Padilla | G01K 7/003 |
| | | | 359/315 |
| 2014/0176413 A1 | 6/2014 | Jung et al. | |
| 2014/0268264 A1 | 9/2014 | Lee et al. | |
| 2015/0331297 A1 | 11/2015 | Han et al. | |
| 2016/0109630 A1* | 4/2016 | Ichihashi | C09K 19/54 |
| | | | 250/338.1 |
| 2016/0197447 A1* | 7/2016 | Luo | G02F 1/225 |
| | | | 250/504 R |
| 2019/0109379 A1* | 4/2019 | Smith | G03H 1/0808 |

OTHER PUBLICATIONS

Evlyukhin et al., "Optical Response Features of Si-Nanoparticle Arrays," Physical Review B, vol. 82, 2010, pp. 045404-1-12.

Garcia-Etxarri et al., "Strong Magnetic Response of Submicron Silicon Particles in the Infrared," Optics Express, vol. 19, No. 6, Mar. 14, 2011, pp. 4815-4826.

Kuznetsov et al., "Magnetic Light," Scientific Reports, vol. 2, No. 492, 2012, pp. 1-6.

Fu et al., "Directional Visible Light Scattering by Silicon Nanoparticles," Nature Communications, vol. 4, No. 1527, 2013, pp. 1-6.

Staude et al., "Tailoring Directional Scattering through Magnetic and Electric Resonances in Subwavelength Silicon Nanodisks," ACS Nano, vol. 7, No. 9, 2013, pp. 7824-7832.

Decker et al., "High-Efficiency Dielectric Huygens' Surfaces," Adv. Optical Materials, vol. 3, 2015, pp. 813-820.

Yu et al., "High-Transmission Dielectric Metasurface with 2-$\pi$ Phase Control at Visible Wavelengths," Laser Photonics Rev., vol. 9, No. 4, 2015, pp. 412-418.

Shrekenhamer et al., "Liquid Crystal Tunable Metamaterial Absorber," Physical Review Letters, vol. 110, 2013, pp. 177403-1-5.

Buchnev et al., "Electrically Controlled Nanostructured Metasurface Loaded with Liquid Crystal: Toward Multifunctional Photonic Switch," Adv. Optical Materials, vol. 3, 2015, pp. 674-679.

Huang et al., "Gate-Tunable Conducting Oxide Metasurfaces," Nano Letters, vol. 16, 2016, pp. 5319-5325.

Sautter et al., "Active Tuning of All-Dielectric Metasurfaces," ACS Nano, vol. 9, No. 4, 2015, pp. 4308-4315.

Luk'Yanchuk et al., "Optimum Forward Light Scattering by Spherical and Spheroidal Dielectric Nanoparticles with High Refractive Index," ACS Photonics, vol. 2, 2015, pp. 993-999.

Devore, J.R., "Refractive Indices of Rutile and Sphalerite," Journal of the Optical Society of America, vol. 41, No. 6, Jun. 1951, pp. 416-419.

Konig et al., "Electrically Tunable Plasmonic Behavior of Nanocube—Polymer Nanomaterials Induced by a Redox-Active Electrochromic Polymer," ACS Nano, vol. 8, No. 6, 2014, pp. 6182-6192.

Li et al., "Refractive Indices of Liquid Crystals for Display Applications," Journal of Display Technology, vol. 1, No. 1, Sep. 2005, pp. 51-61.

International Preliminary Report on Patentability for International Application No. PCT/SG2017/050031 dated Nov. 1, 2017, pp. 1-25.

* cited by examiner

Form a first electrode layer

402

Form a second electrode layer

404

Form a matrix layer between the first electrode layer and the second electrode layer

Provide the electromagnetic wave to a device — 502

Apply a voltage between the first electrode layer and the second electrode layer so that the liquid crystal layer switches from a first state to a second state in response to the voltage applied to control the electromagnetic wave received by the matrix layer — 504

1012

DEVICE AND ARRANGEMENT FOR CONTROLLING AN ELECTROMAGNETIC WAVE, METHODS OF FORMING AND OPERATING THE SAME

CROSS-REFERENCE TO RELATED APPLICATION

This application claims the benefit of priority of Singapore application No. 10201600943U filed on Feb. 5, 2016, the contents of it being hereby incorporated by reference in its entirety for all purposes.

TECHNICAL FIELD

Various aspects of this disclosure relate to devices and/or arrangements for controlling electromagnetic waves. Various aspects of this disclosure relate to methods of forming devices and/or arrangements for controlling electromagnetic waves, and/or methods of operating devices and/or arrangements to control electromagnetic waves.

BACKGROUND

Reconfigurable devices are devices containing one or several parts that can be actively controlled by means of a signal (electrical, optical or of other nature) to modify the optical response for wave front control of amplitude, phase and/or polarization of electromagnetic waves. Reconfigurable devices may include spatial light modulators (SLM). An example of a simple design for manipulation of amplitude is an arrangement including arrays of micro-mirrors that are able to rotate to switch between reflecting and not reflecting the electromagnetic waves. FIG. 1A is a schematic illustrating a micro-electro-mechanical systems (MEMS) based micro-mirror 100a. FIG. 1B is a schematic illustrating another micro-electro-mechanical systems (MEMS) based micro-mirror 100b. FIG. 1C is a scanning electron microscopy (SEM) image 100c showing a top planar view of a micro-mirror. FIG. 1D is a scanning electron microscopy (SEM) image 100d showing a perspective view of a micro-mirror.

Another way for controlling the phase of electromagnetic waves is realized using an array of cells containing a liquid crystal (LC). A voltage is applied to each individual cell to modify the orientation of the particles comprised in the LC, thus changing the refractive index of the LC. FIG. 2A is a schematic showing a liquid crystal display (LCD) 200a. A LCD may be, for example, a liquid crystal on silicon (LCoS) display or a ferroelectric liquid crystal (FLCoS) in silicon display. FIG. 2B is a schematic showing another liquid crystal display (LCD) 200b. FIG. 2C is a scanning electron microscopy (SEM) image 200c of a liquid crystal display (LCD). A LCD may be, for example, a liquid crystal on silicon (LCoS) display or a ferroelectric liquid crystal (FLCoS) in silicon display. By varying the refractive index of the LC, the electromagnetic waves experience a different optical path in each cell and thus have different phase shifts. For reflection devices, the cell may need to have a sufficient thickness so that an electromagnetic wave passing through the cell experiences at least about half a wavelength shift due to the change in refractive index. Alternatively, for transmission devices, the cell may be required to have a sufficient thickness of at least one wavelength shift due to the change in refractive index. As a consequence of the large thickness, the voltage required to re-orientate the liquid crystal may be rather high. At high voltages, the cross-talk between neighbouring cells or pixels may happen when the cell size is reduced beyond a certain limit. Accordingly, minimum pixel size of the device may also be limited. Currently, commercially available devices may have minimum pixel sizes of around 3 μm, which may impose a serious limitation in the resolution of near-eye devices using liquid crystal technology.

SUMMARY

Various embodiments may provide a device for controlling an electromagnetic wave. The device may include a first electrode layer. The device may also include a second electrode layer. The device may further include a matrix layer between the first electrode layer and the second electrode layer. The matrix layer may include a liquid crystal layer. The matrix layer may also include at least one resonator element in contact with the liquid crystal layer. The liquid crystal layer may be configured to switch, at least, from a first state to a second state in response to a voltage applied between the first electrode layer and the second electrode layer, thereby changing an optical property of the matrix layer to control the electromagnetic wave received by the matrix layer.

Various embodiments may provide a method of forming a device for controlling an electromagnetic wave. The method may include forming a first electrode layer. The method may also include forming a second electrode layer. The method may further include forming a matrix layer between the first electrode layer and the second electrode layer. The matrix layer may include a liquid crystal layer. The matrix layer may also include at least one resonator element in contact with the liquid crystal layer. The liquid crystal layer may be configured to switch, at least, from a first state to a second state in response to a voltage applied between the first electrode layer and the second electrode layer, thereby changing an optical property of the matrix layer to control the electromagnetic wave received by the matrix layer.

Various embodiments may provide a method of operating a device to control an electromagnetic wave. The method may include providing the electromagnetic wave to a device. The device may include a first electrode layer. The device may also include a second electrode layer. The device may further include a matrix layer between the first electrode layer and the second electrode layer. The matrix layer may include a liquid crystal layer. The matrix layer may also include at least one resonator element in contact with the liquid crystal layer. The method may also include applying a voltage between the first electrode layer and the second electrode layer so that the liquid crystal layer switches, at least, from a first state to a second state in response to the voltage applied to control the electromagnetic wave received by the matrix layer.

Various embodiments may provide an arrangement. The arrangement may include a device for controlling an electromagnetic wave. The device may include a first electrode layer. The device may also include a second electrode layer. The device may further include a matrix layer between the first electrode layer and the second electrode layer. The matrix layer may include a liquid crystal layer. The matrix layer may also include at least one resonator element in contact with the liquid crystal layer. The liquid crystal layer may be configured to switch, at least, from a first state to a second state in response to a voltage applied between the first electrode layer and the second electrode layer, thereby changing an optical property of the matrix layer to control the electromagnetic wave received by the matrix layer. The arrangement may also include an electromagnetic wave source configured to emit the electromagnetic wave.

Various embodiments may provide a method of forming an arrangement. The method may include providing a device for controlling an electromagnetic wave. The device may include a first electrode layer. The device may also include a second electrode layer. The device may further include a matrix layer between the first electrode layer and the second electrode layer. The matrix layer may include a liquid crystal layer. The matrix layer may also include at least one resonator element in contact with the liquid crystal layer. The liquid crystal layer may be configured to switch, at least, from a first state to a second state in response to a voltage applied between the first electrode layer and the second electrode layer, thereby changing an optical property of the matrix layer to control the electromagnetic wave received by the matrix layer. The method may also include providing an electromagnetic wave source configured to emit the electromagnetic wave.

Various embodiments may provide a method of operating an arrangement to control an electromagnetic wave. The method may include providing a device for controlling an electromagnetic wave. The device may include a first electrode layer, a second electrode layer, and a matrix layer between the first electrode layer and the second electrode layer. The matrix layer may include a liquid crystal layer, and at least one resonator element in contact with the liquid crystal layer. The method may also include providing an electromagnetic wave source configured to emit the electromagnetic wave. The method may additionally include applying a voltage between the first electrode layer and the second electrode layer so that the liquid crystal layer switches, at least, from a first state to a second state in response to the voltage applied to control the electromagnetic wave received by the matrix layer.

BRIEF DESCRIPTION OF THE DRAWINGS

The invention will be better understood with reference to the detailed description when considered in conjunction with the non-limiting examples and the accompanying drawings, in which:

FIG. 4 is a schematic showing a method of forming a device for controlling an electromagnetic wave according to various embodiments.

FIG. 5 is a schematic showing a method of operating a device to control an electromagnetic wave according to various embodiments.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or device/arrangement are analogously valid for the other methods or memory cells/devices. Similarly, embodiments described in the context of a method are analogously valid for a device/arrangement, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may also be used herein to mean that the deposited material may be formed "indirectly on" the implied side or surface with one or more additional layers being arranged between the implied side or surface and the deposited material. In other words, a first layer "over" a second layer may refer to the first layer directly on the second layer, or that the first layer and the second layer are separated by one or more intervening layers.

The device or arrangement as described herein may be operable in various orientations, and thus it should be understood that the terms "top", "bottom", etc., when used in the following description are used for convenience and to aid understanding of relative positions or directions, and not intended to limit the orientation of the device or arrangement.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Figure 1A:
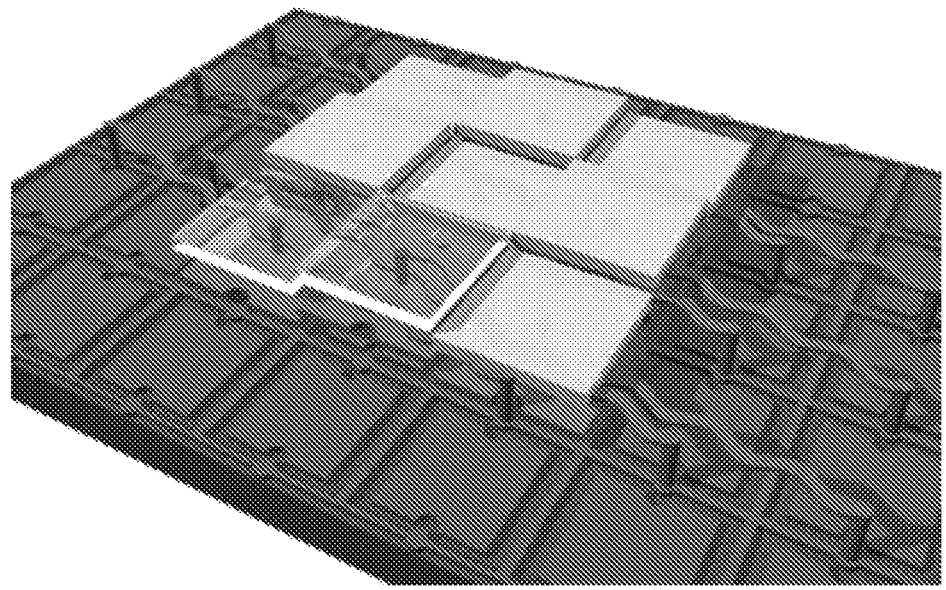
FIG. 1A is a schematic illustrating a micro-electro-mechanical systems (MEMS) based micro-mirror.
Figure 1B:
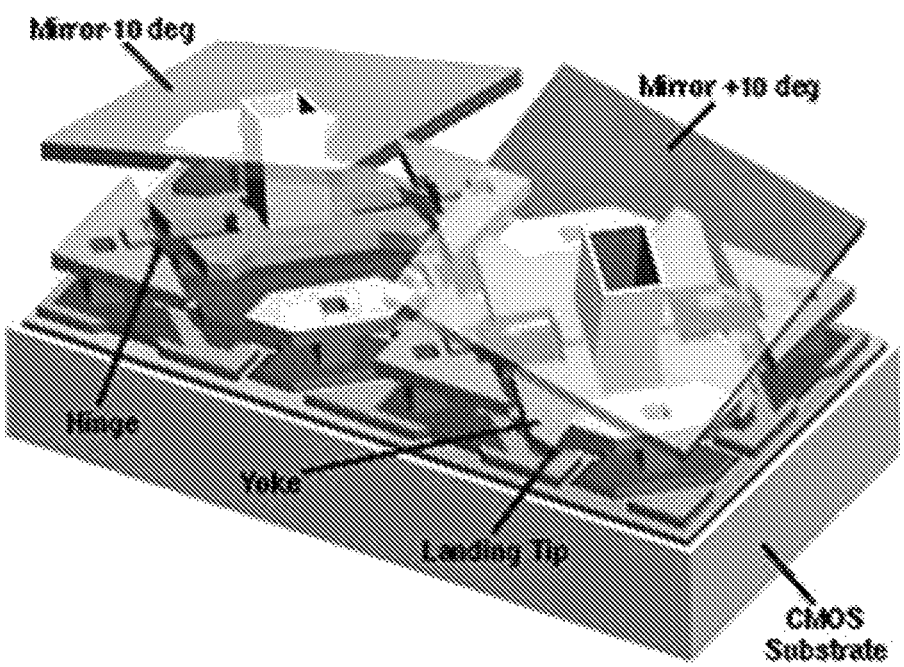
FIG. 1B is a schematic illustrating another micro-electromechanical systems (MEMS) based micro-mirror.
Figure 1C:
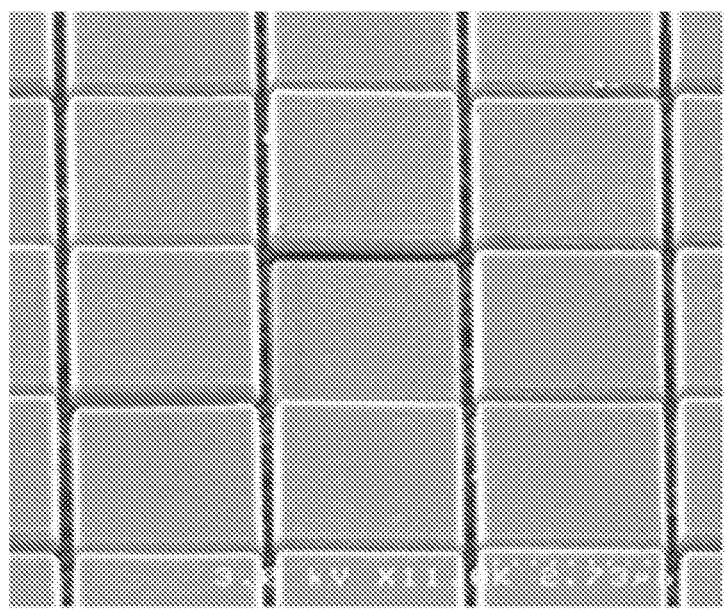
FIG. 1C is a scanning electron microscopy (SEM) image showing a top planar view of a micro-mirror.
Figure 1D:
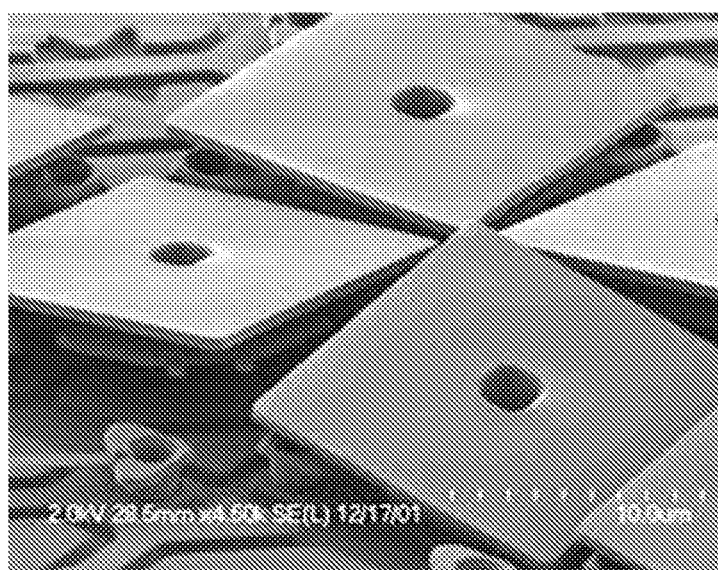
FIG. 1D is a scanning electron microscopy (SEM) image showing a perspective view of a micro-mirror.
Figure 2A:
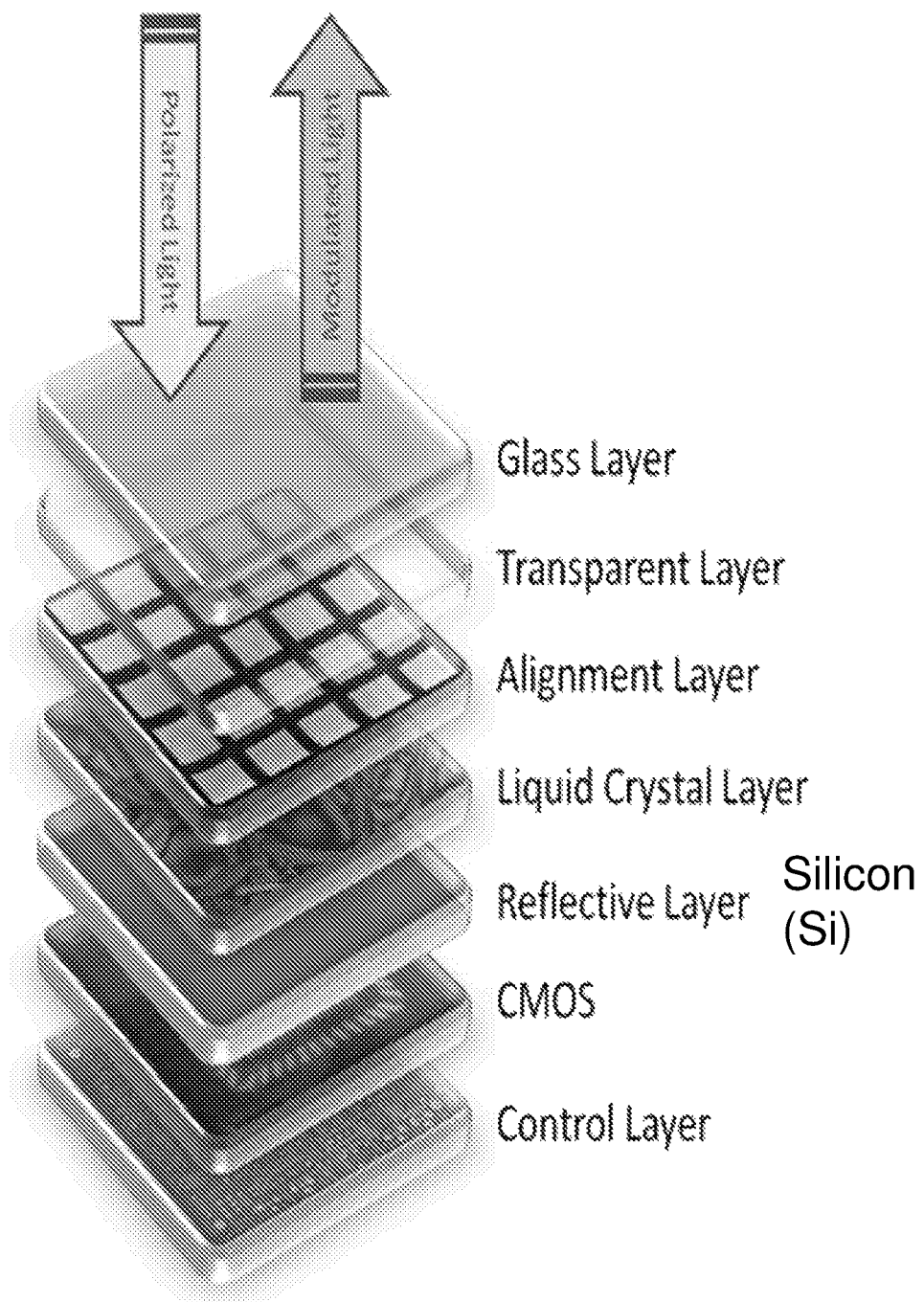
FIG. 2A is a schematic showing a liquid crystal display (LCD). A LCD may be, for example, a liquid crystal on silicon (LCoS) display or a ferroelectric liquid crystal (FL-CoS) in silicon display.
Figure 2B:
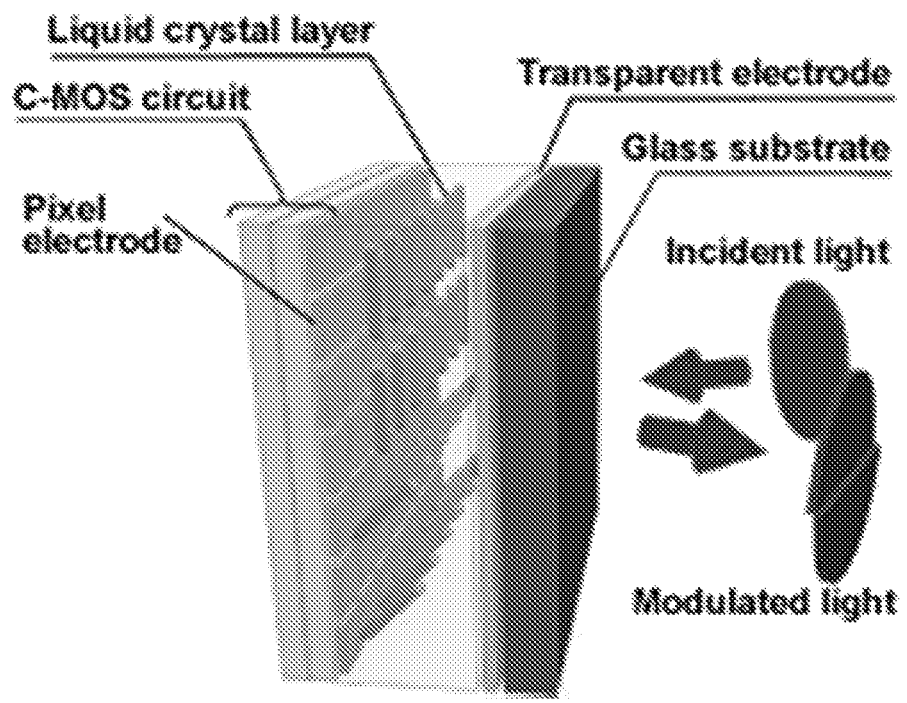
FIG. 2B is a schematic showing another liquid crystal display (LCD).
Figure 2C:
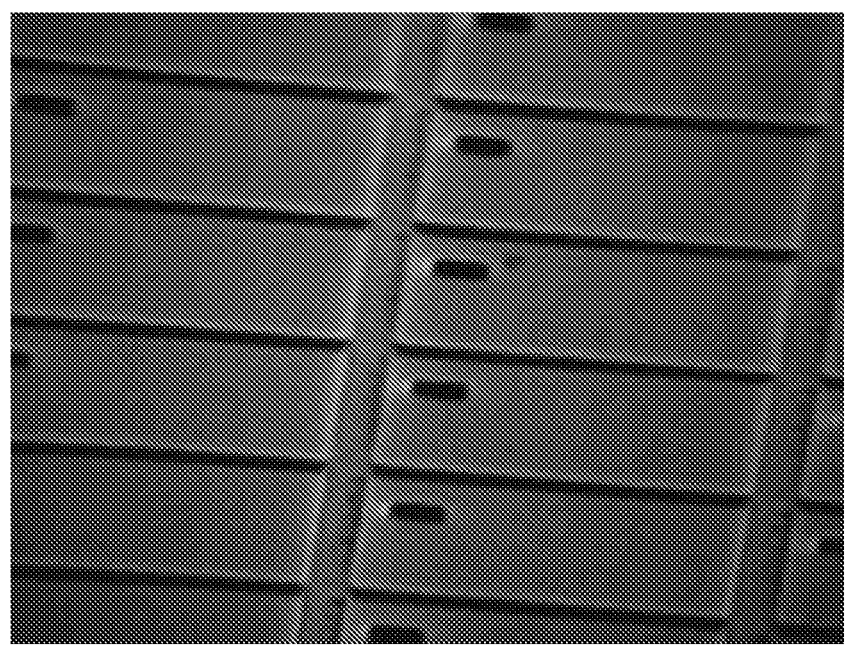
FIG. 2C is a scanning electron microscopy (SEM) image of a liquid crystal display (LCD).
Figure 3:
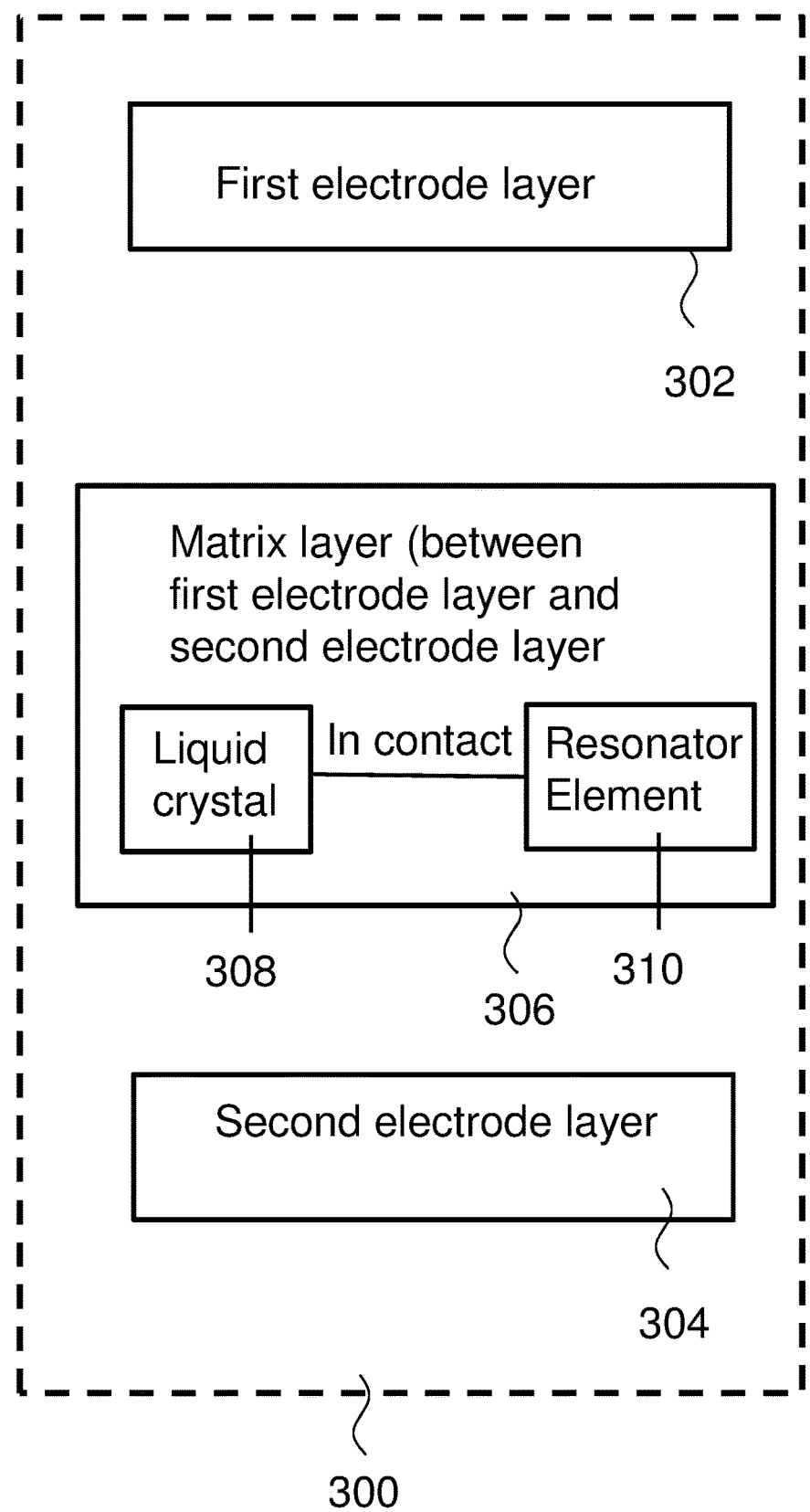
FIG. 3 is a schematic illustrating a device for controlling an electromagnetic wave according to various embodiments.

FIG. 3 is a schematic illustrating a device 300 for controlling an electromagnetic wave according to various embodiments. The device 300 may include a first electrode layer 302. The device 300 may also include a second electrode layer 304. The device 300 may further include a matrix layer 306 between the first electrode layer 302 and the second electrode layer 304. The matrix layer 306 may include a liquid crystal layer 308. The matrix layer 306 may also include at least one resonator element 310 in contact with the liquid crystal layer 308. The liquid crystal layer 308 may be configured to switch, at least, from a first state to a second state in response to a voltage applied between the first electrode layer 302 and the second electrode layer 304, thereby changing an optical property of the matrix layer 306 to control the electromagnetic wave received by the matrix layer 306.

In other words, the device may include a first electrode 302, a matrix layer 306, and the second electrode 304. The matrix layer 306 may include a liquid crystal layer 308 at least partially covering at least one resonator element 310. Application of a voltage between the first electrode 302 and the second electrode 304 may change the state of the liquid crystal layer 308 and the optical property of the matrix layer 306 to cause a change, e.g. a phase shift, in the electromagnetic wave incident on the matrix layer.

In various embodiments, the inclusion of the at least one resonator element 310 may provide phase accumulation without introducing spatial propagation of the electromagnetic wave. In other words, the at least one resonator element 310 may contribute to the phase shift of the electromagnetic wave without increasing a thickness of the device. Various embodiments may thus lead to a reduction in the voltage to be applied to change the optical property of the matrix layer 306. The total thickness of the matrix necessary to achieve a given phase shift may be reduced when the resonators are present. Various embodiments may lead to a reduction in cross-talk, and/or a reduction in the pixel size. Various embodiments may seek to address the problems facing conventional devices such as conventional liquid crystal cells.

The optical property of the matrix layer 306 may refer to a refractive index of the liquid crystal layer 308.

In various embodiments, the device may be a liquid crystal (LC) cell. In various embodiments, the device may be an array including a plurality of liquid crystal (LC) cells. The device may be a phase-modulation spatial light modulator (SLM).

At least one resonance of the at least one resonator element 310 may also be changed in response to the voltage applied between the first electrode layer and the second electrode layer. The at least one resonance may refer to a magnetic (dipole or dipolar) resonance, an electric (dipole or dipolar) resonance, or both the magnetic (dipole or dipolar) resonance and the electric (dipole or dipolar) resonance. In various embodiments, the at least one resonance of the at least one resonator element 310 may be changed by changing the environment, i.e. by changing the state of the liquid crystal layer 308. The at least one resonator element may act as antenna. The resonator elements 310 may be referred to as antennas or particles.

Currently, great deal of attention has been paid to the optical properties of dielectric nanostructures due to the possibility of supporting magnetic resonances and acting as Huygens' sources. At the same time, most of the studies dealing with the interaction of antennae with reconfigurable environment have been focused on active tuning of the antenna resonances. By actively controlling the optical properties of the environment (e.g. using LC), it may be possible to modify the resonances of the elements. Several studies have been performed regarding resonances in metallic nanostructures (plasmon excitation) and, more recently, also with dielectric antennas. The latter, however, focused on the active tuning of the resonance positions and modulation of the amplitude of the transmitted wave. No attention has been paid to the possibility of exploiting the combination of LC and antennas to achieve compact phase-modulation SLMs.

In various embodiments, the electromagnetic wave received by the matrix layer 306 may undergo a phase shift or phase accumulation which is induced by the switching of the liquid crystal layer 308, e.g. from a first state to a second state. The electromagnetic wave received by the matrix layer 306 may undergo a phase shift or phase accumulation which is induced by the at least one resonator element 310, e.g. due to the change in the at least one resonance of the at least one resonator element 310. A combined phase shift or phase accumulation of the electromagnetic wave may be a sum of the phase shift or phase accumulation due to the switching of the liquid crystal layer 308 (referred to as a first phase shift) and the phase shift or phase accumulation due to the change in resonance of the at least one resonator element 310 (referred to as a second phase shift). In various embodiments, the combined phase shift or phase accumulation may be greater than each of the first phase shift or phase accumulation and the second phase shift or phase accumulation. In other words, in various embodiments, the effects of the first phase shift or phase accumulation and the second phase shift or phase accumulation may be additive in nature so that the combined phase shift or phase accumulation may be greater than the first phase shift or the second phase shift.

In various embodiments, the at least one resonator element may include a dielectric material, such as titanium dioxide ($TiO_2$). In various embodiments, the dielectric element may have a refractive index greater than 2. In various other embodiments, the at least one resonator element may include a plasmonic material, such as a metal, e.g. gold (Au), silver (Ag), aluminum (Al) etc. Each of the at least one resonator element may be a nanostructure, such as a nanocylinder or a nanodisk. However, each of the at least one element may have or may be in any other suitable shape, such as a parallelepiped, a prism, an ellipsoid etc.

In various embodiments, the device 300 may include a stacked arrangement including the first electrode 302, the matrix layer 306, and the second electrode 304 may form. The matrix layer 306 may be over the second electrode 304, which may be referred to as the bottom electrode. The first electrode 302, which may be referred to as a top electrode, may be over the matrix layer 306.

The first electrode 302 may be configured to at least partially or fully allow electromagnetic waves to pass through. The first electrode 302 may be transparent or translucent. The first electrode 302 may be a superstrate or may be comprised in a superstrate. The first electrode 302 may include indium tin oxide (ITO).

The second electrode may be configured to (at least partially or fully) reflect the electromagnetic waves incident on the second electrode. The second electrode may be a reflective substrate or may be comprised in a reflective substrate. The second electrode may include a metal such as Al, Ag, Au etc. The substrate may include a metal such as Al, Ag, Au etc. or may include a dielectric mirror. The dielectric mirror may include a stack of a plurality of dielectric layers. The stack may include layers with a high refractive index interleaved with layers of a low refractive index. The dielectric mirror may include a material selected from a group consisting of magnesium fluoride, silicon dioxide, tantalum pentoxide, zinc sulfide, and titanium dioxide.

The device 300 may include one or more intermediate layers between the first electrode 302 and the matrix layer 306. Additionally or alternatively, the device 300 may include one or more intermediate layers between the second electrode 304 and the matrix layer 306.

The liquid crystal layer 308 configured to switch from a first state to a second state may refer to or may include orientating liquid crystals comprised in the liquid crystal layer 308 from a first direction to a second direction. The first direction may be different from the second direction. The electromagnetic wave may incident normally or perpendicularly to the matrix layer. The first direction may be a direction perpendicular to an electric field of the electromagnetic wave and/or parallel to the direction of propagation of the electromagnetic wave. The first direction may also be perpendicular to a main surface of the first electrode 302 (or superstrate) and/or a main surface of the second electrode 304 (or substrate) and/or a main surface of the matrix layer 306. The liquid crystals may be in a nematic phase when the liquid crystal layer 308 is in the first state. The second direction may be a direction parallel to an electric field of the electromagnetic wave and/or perpendicular to the direction of propagation of the electromagnetic wave. The second direction may be a direction parallel to a main surface of the first electrode 302 (or superstrate) and/or a main surface of the second electrode 304 (or substrate) and/or a main surface of the matrix layer 306. The liquid crystal layer 308 may be a switchable matrix layer. The liquid crystals may be in a nematic phase when the liquid crystal layer 308 is in the second state. The liquid crystals may for example be composed of N-(4-methoxybenzylidene)-4-butylaniline (MBBA) or 4-(1-methyl-heptyloxycarbonyl)-phenyl ester (MHPOBC) or 4-cyano-4'-n-pentyl-biphenyl (5CB) or 4-cyano-4'-n-heptyl-biphenyl (7CB) or 4-cyano-4'-n-oxyoctyl-biphenyl (8OCB) or 4-cyano-4"-n-pentyl-p-terphenyl (5CT).

The liquid crystal layer 308 may also have further states in which the liquid crystals are oriented in other directions different from the first direction and the second direction. The liquid crystal layer may be configured to switch to other states in response to further voltages applied between the first electrode layer and the second electrode layer. For instance, the liquid crystal layer 308 may have a third state in which the liquid crystals are oriented in a third direction different from the first direction and the second directions. In other words, the liquid crystal layer 308 may change between more than just two states. The liquid crystal layer 308 may change within a continuum of states as, for example, when a continuously increasing voltage is applied.

The at least one resonator element may refer to or may include an array of resonator elements. In various embodiments, the array may be a periodic and/or an ordered array. The array may be a square array or any other Bravais lattice. In various other embodiments, the array may be an aperiodic array.

In various embodiments, the at least one resonator element 310 may be nearer to the first electrode 302 compared to the second electrode 304. The at least one resonator element 310 may be in contact with the first electrode 302 or may be arranged on the superstrate.

In various other embodiments, the at least one resonator element 310 may be nearer to the second electrode 304 compared to the first electrode 302. The at least one resonator element 310 may be in contact with the second electrode 304 or may be arranged on the substrate.

In yet various other embodiments, the at least one resonator 310 may include a first resonator element or a first group of resonator elements nearer to the first electrode 302 compared to the second electrode 304, and a second resonator element or second group of resonator elements nearer to the second electrode 304 compared to the first electrode 302. The first resonator element or first group of resonator elements may be in contact with the first electrode 302 or may be arranged on the superstrate. The second resonator element or second group of resonator elements may be in contact with the second electrode 304 or may be arranged on the substrate.

Various embodiments may provide an arrangement. The arrangement may include a device 300 as described herein. The arrangement may also include an electromagnetic wave source configured to emit the electromagnetic wave, which may be transmitted to the device 300.

FIG. 4 is a schematic 400 showing a method of forming a device for controlling an electromagnetic wave according to various embodiments. The method may include, in 402, forming a first electrode layer. The method may also include, in 404, forming a second electrode layer. The method may further include, in 406, forming a matrix layer between the first electrode layer and the second electrode layer. The matrix layer may include a liquid crystal layer. The matrix layer may also include at least one resonator element in contact with the liquid crystal layer. The liquid crystal layer may be configured to switch, at least, from a first state to a second state in response to a voltage applied between the first electrode layer and the second electrode layer, thereby changing an optical property of the matrix layer to control the electromagnetic wave received by the matrix layer.

In other words, the method may include forming a device as described herein.

For avoidance of doubt, FIG. 4 is not intended to denote any particular sequence of steps. In various embodiments, the second electrode layer may be formed first, followed by the matrix layer. The first electrode layer may be formed after forming the matrix layer.

In various embodiments, a method of forming an arrangement may be provided. The method may include providing a device for controlling an electromagnetic wave as described herein. The method may also include providing an electromagnetic wave source configured to emit the electromagnetic wave.

FIG. 5 is a schematic 500 showing a method of operating a device to control an electromagnetic wave according to various embodiments. The method may include, in 502, providing the electromagnetic wave to a device. The device may include a first electrode layer. The device may also include a second electrode layer. The device may further include a matrix layer between the first electrode layer and the second electrode layer. The matrix layer may include a liquid crystal layer. The matrix layer may also include at least one resonator element in contact with the liquid crystal layer. The method may include, in 504, applying a voltage between the first electrode layer and the second electrode layer so that the liquid crystal layer switches, at least, from a first state to a second state in response to the voltage applied to control the electromagnetic wave received by the matrix layer.

In other words, an electromagnetic wave transmitted to the device may be controlled by application of a voltage between the electrodes of the device. The device may include the liquid crystal layer and at least one resonator in contact with the liquid crystal layer.

For avoidance of doubt, FIG. 5 is not intended to denote any particular sequence of steps.

Controlling the electromagnetic wave may include inducing a phase shift or a phase difference of the electromagnetic wave. The phase shift or the phase difference may be a value selected from a range from 0 radian to $2\pi$ radians.

In various embodiments, at least one resonance of the at least one resonator element may be changed by applying the voltage between the first electrode layer and the second electrode layer. The at least one resonance may refer to a magnetic (dipole or dipolar) resonance, an electric (dipole or dipolar) resonance, or both a magnetic (dipole or dipolar) resonance and an electric (dipole or dipolar) resonance. In various embodiments, the at least one resonance of the at least one resonator element may be changed by changing the environment, i.e. by changing the state of the liquid crystal layer.

In various embodiments, the liquid crystal layer may include liquid crystals. The liquid crystals may be oriented in a direction perpendicular to an electric field of the electromagnetic wave when the liquid crystal layer is in the first state. The liquid crystals may be oriented in a direction parallel to the electric field of the electromagnetic wave when the liquid crystal layer is in the second state.

Various embodiments may provide a method of operating an arrangement to control an electromagnetic wave. The method may include providing a device for controlling an electromagnetic wave. The device may include a first electrode layer, a second electrode layer, and a matrix layer between the first electrode layer and the second electrode layer. The matrix layer may include a liquid crystal layer, and at least one resonator element in contact with the liquid crystal layer. The method may also include providing an electromagnetic wave source configured to emit the electromagnetic wave. The method may additionally include applying a voltage between the first electrode layer and the second electrode layer so that the liquid crystal layer switches, at least, from a first state to a second state in response to the voltage applied to control the electromagnetic wave received by the matrix layer.

Figure 6A:
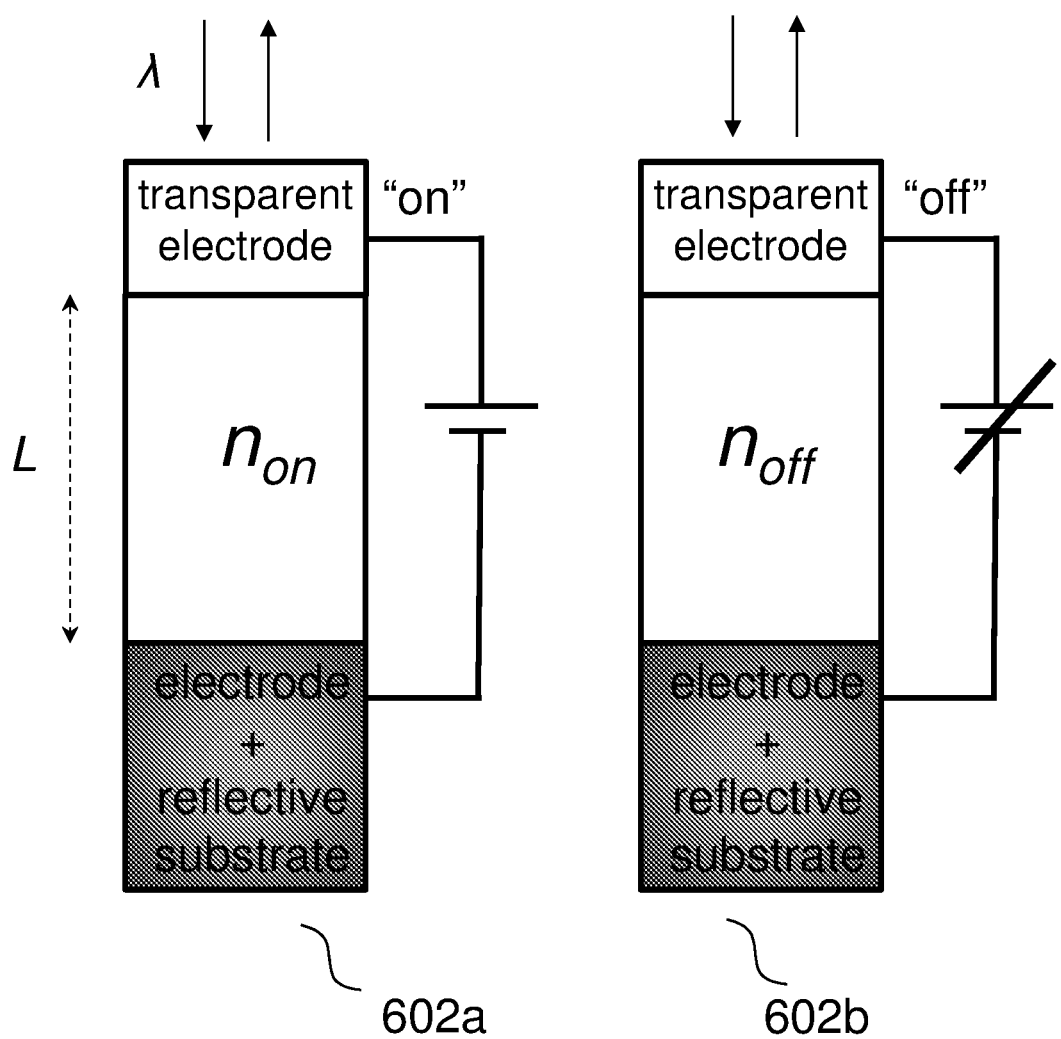
FIG. 6A is a schematic showing a conventional liquid crystal cell in the "on" state and the liquid crystal cell in the "off" state.

FIG. 6A is a schematic showing a conventional liquid crystal cell in the "on" state 602a and the liquid crystal cell in the "off" state 602b. The phase accumulation $\Delta\phi$ between orthogonal liquid crystal orientations may be provided by:

$$\Delta\phi = 4\pi\Delta n L/\lambda \quad (1)$$

where $\lambda$ is the wavelength of the electromagnetic wave, and L is the thickness of the liquid crystal layer. $\Delta n$ is the change in refractive index provided by:

$$\Delta n = n_{on} - n_{off} \ll 1 \quad (2)$$

where $n_{on}$ is the refractive index of the liquid crystal layer in the "on" state and $n_{off}$ is the refractive index of the liquid crystal layer in the "off" state.

Thus, for $\Delta\phi = 2\pi$, $$L \gg \lambda/2 \quad (3)$$

Figure 6B:
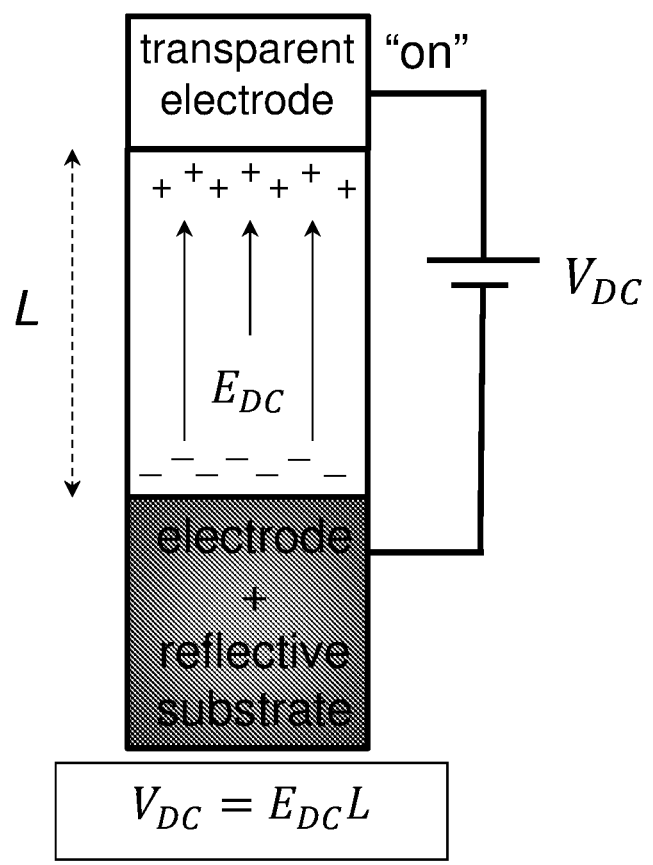
FIG. 6B is a schematic of the conventional liquid cell connected to a voltage source.

FIG. 6B is a schematic of the conventional liquid cell 602c connected to a voltage source. The voltage $V_{DC}$ required to modulate the phase may be provided by:

$$V_{DC} E_{DC} L \quad (4)$$

where $E_{DC}$ is the electric field necessary to switch the liquid crystal layer from the "off" state to the "on" state.

FIG. 6B and Equation (4) indicate that a reduction in the thickness L of the liquid crystal layer may reduce the voltage $V_{DC}$ required to modulate the phase.

Figure 6C:
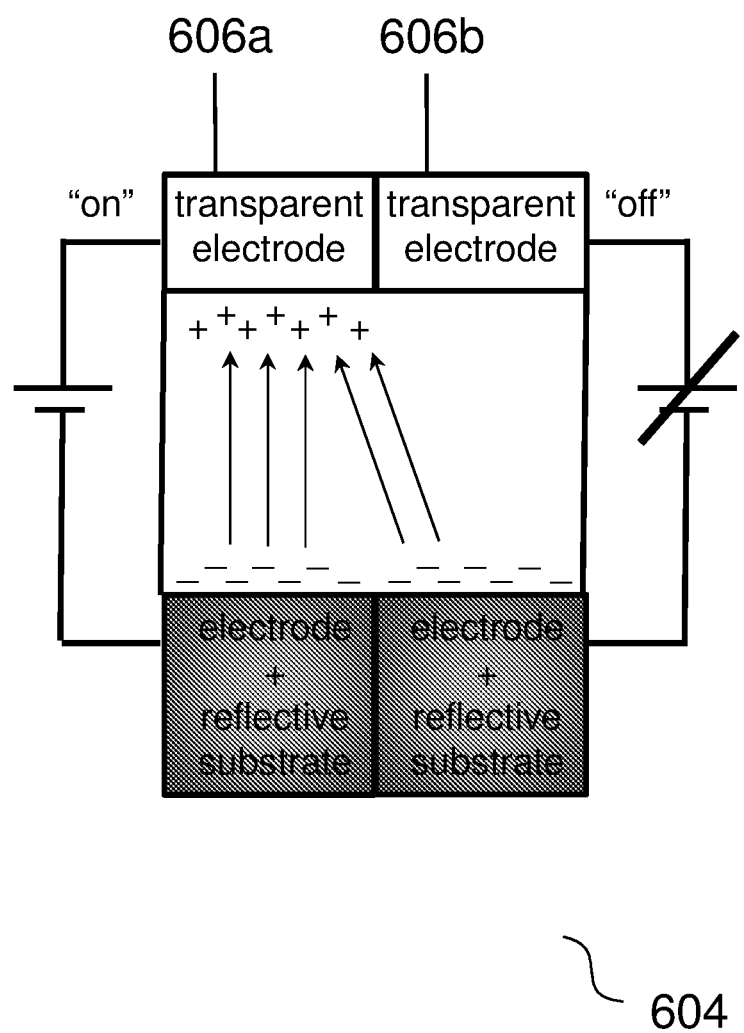
FIG. 6C shows an array with neighbouring liquid crystal cells.

FIG. 6C shows an array 604 with neighbouring liquid crystal cells 606a, 606b. Cell 606a is in the "on" state, while cell 606b is in the "off" state. There is crosstalk between the cells 606a, 606b. At high voltages, the cross-talk between neighbouring cells 606a, 606b may happen when the cell size is reduced beyond a certain limit. Further, a high voltage may lead to electrode heating.

Various embodiments may provide a device or liquid crystal cell including subwavelength resonator elements or particles in a switchable matrix layer or liquid crystal layer. In various embodiments, the elements or particles may be arranged in a one-layer or a two-layer configuration to enhance phase accumulation. Various embodiments may allow reduction of the switchable matrix layer or liquid crystal layer. Due to the resonances excited within the elements or particles, each element or particle may provide phase accumulation that adds to the phase accumulation due to the change of the switchable matrix layer or liquid crystal layer, which may allow the desired 2n phase accumulation to be achieved with thinner layers of the switchable material or liquid crystal. Consequently, the voltage needed to generate the static field that force the change of state of the switchable material or liquid crystal may be reduced. Accordingly, the cross-talk between neighboring cells and heating of the contacts may also be reduced. This may allow the reduction of the pixel size, which may lead to devices with increased resolution, which may be a quality of great interest, in particular for applications such as wearable, near-eye devices. In various embodiments, the resonator elements may be dielectric resonators. Dielectric resonator may have low dissipation, so that the resonances may not generate additional losses in the system. At the same time, the fabrication of the dielectric nanostructures may be compatible in complementary metal oxide semiconductor (CMOS) processes. Various embodiments may be readily compatible with most standard LC-based SLMs, including Liquid Crystal on Silicon (LCOS) SLMs.

Figure 7A:
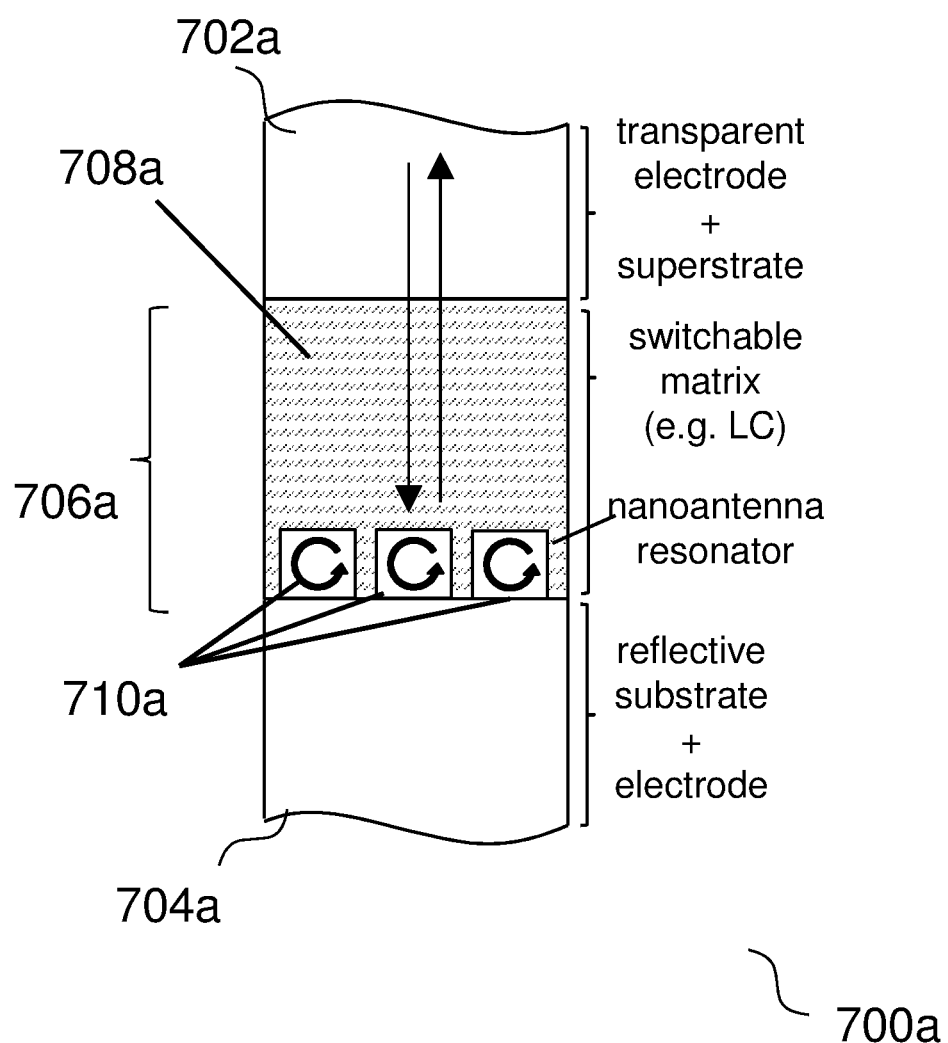
FIG. 7A is a schematic of a device according to various embodiments.

FIG. 7A is a schematic of a device 700a according to various embodiments. The device 700 may include a transparent electrode/superstrate 702a, a reflective substrate/electrode 704a, and a matrix layer 706a between the transparent electrode/superstrate 702a and the reflective substrate/electrode 704a. The transparent electrode/superstrate 702a may be in contact with a first end of the matrix layer 706a and the reflective substrate/electrode 704a may be in contact with a second end of the matrix layer 706a opposite the first end. The matrix layer 706a may include a liquid crystal layer 708a and an array of resonator elements 710a in contact with the liquid crystal layer 708a. The array of resonator elements 710a may form a single layer, and may be in contact with the reflective substrate/electrode 704a.

Figure 7B:
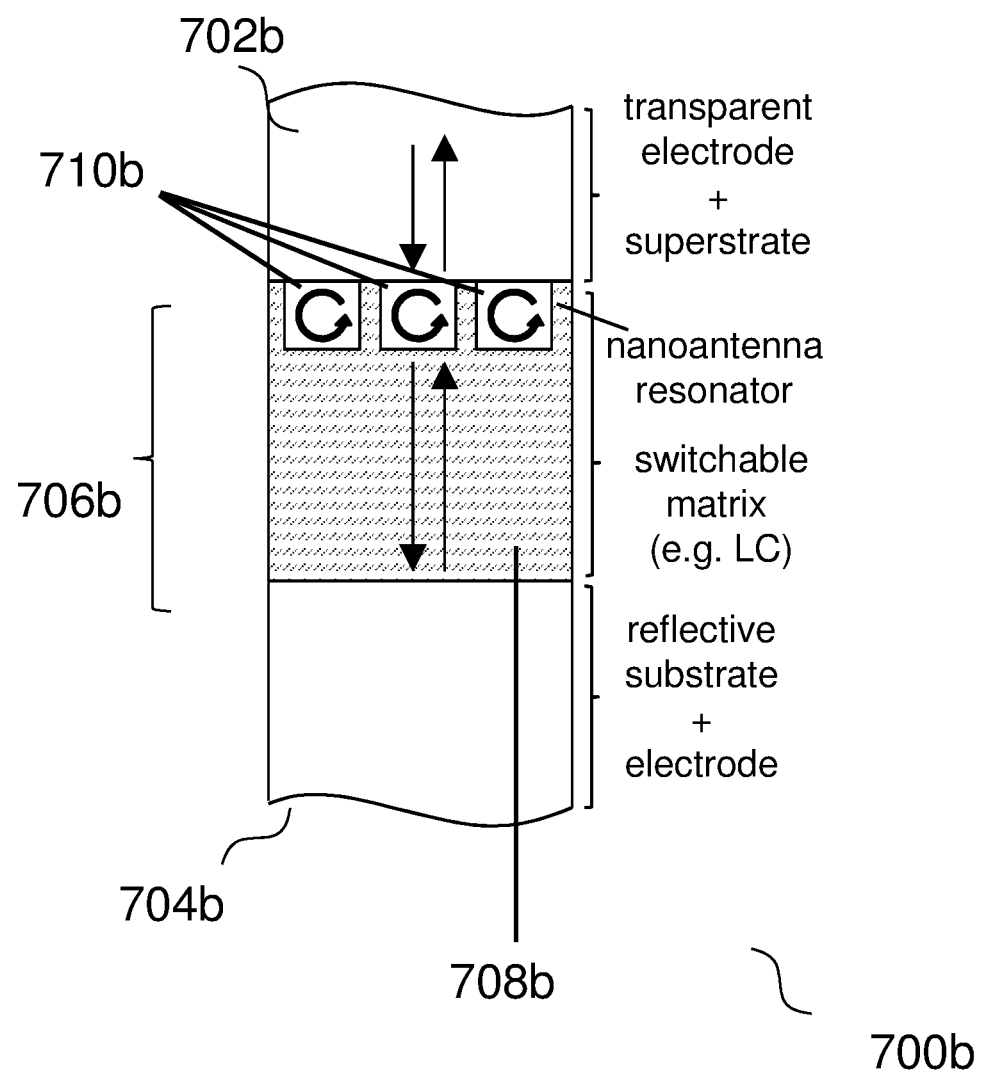
FIG. 7B is a schematic of a device according to various other embodiments.

FIG. 7B is a schematic of a device 700b according to various other embodiments. Similar to FIG. 7A, the device 700b may include a transparent electrode/superstrate 702b, a reflective substrate/electrode 704b, and a matrix layer 706b between the transparent electrode/superstrate 702b and the reflective substrate/electrode 704b. The transparent electrode/superstrate 702b may be in contact with a first end of the matrix layer 706b and the reflective substrate/electrode 704b may be in contact with a second end of the matrix layer 706b opposite the first end. The matrix layer 706b may include a liquid crystal layer 708b and an array of resonator elements 710b in contact with the liquid crystal layer 708b. The array of resonator elements 710b may form a single layer, and may be in contact with the transparent electrode/superstrate 702b.

Figure 7C:
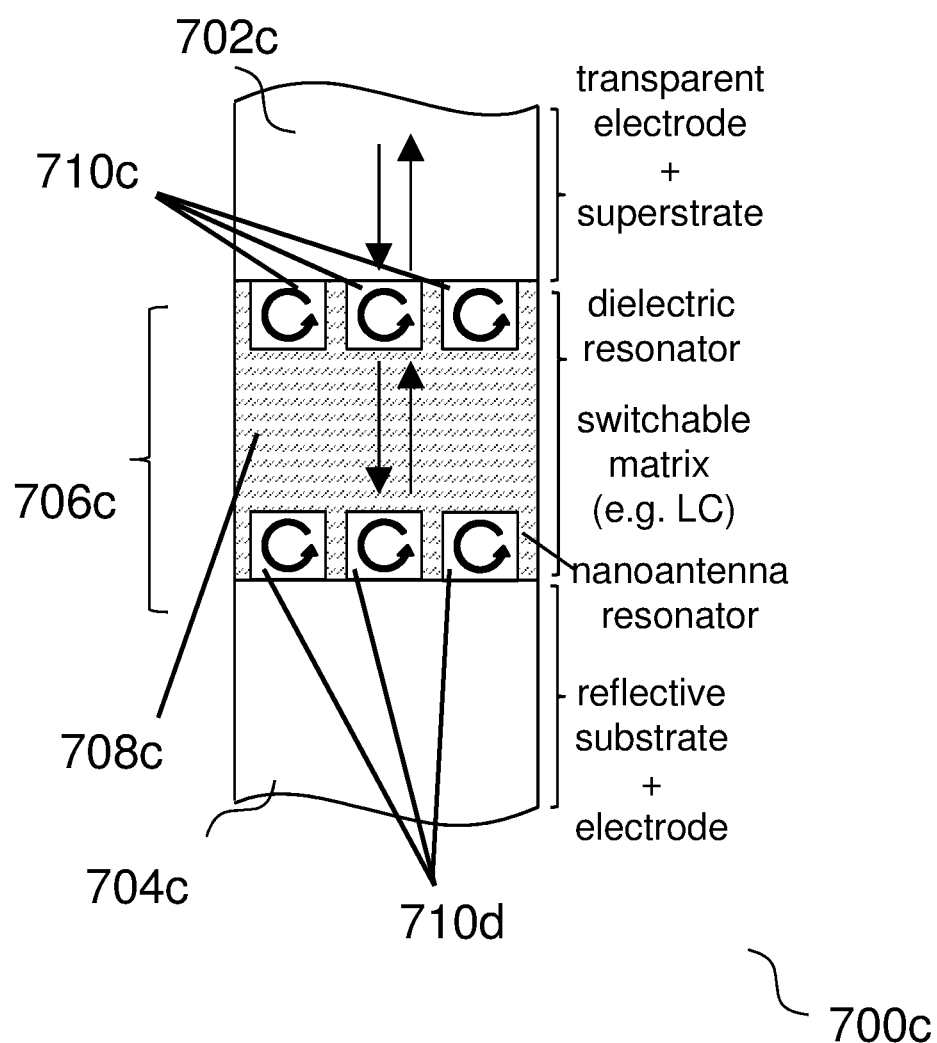
FIG. 7C is a schematic of a device according to yet various other embodiments.

FIG. 7C is a schematic of a device 700c according to yet various other embodiments. The device 700c may include a transparent electrode/superstrate 702c, a reflective substrate/electrode 704c, and a matrix layer 706c between the transparent electrode/superstrate 702c and the reflective substrate/electrode 704c. The transparent electrode/superstrate 702c may be in contact with a first end of the matrix layer 706c and the reflective substrate/electrode 704c may be in contact with a second end of the matrix layer 706c opposite the first end. The matrix layer 706c may include a liquid crystal layer 708c and a first array of resonator elements 710c and a second array of resonator elements 710d in contact with the liquid crystal layer 708c. The first array of resonator elements 710c may be arranged as a layer, and may be in contact with the transparent electrode/superstrate 702c, while the second array of resonator elements 710d may be arranged as another separate layer, and may be in contact with the reflective substrate/electrode 704c.

The reflective substrate/electrode 704a-c may be an electrode or may be a reflective substrate including an electrode. The substrate may include a metal or may be a dielectric mirror. The substrate may also include one or more further intermediate reflective or transparent layers.

The transparent electrode/superstrate 702a-c may be an electrode or may be a transparent substrate including an electrode. The superstrate may include one or more further transparent intermediate layers. The transparent electrode/superstrate 702a-c may include indium tin oxide.

The elements 710a-d may act as resonators, and may be of different shapes such disks, parallelepipeds, prisms, ellipsoids, etc. In various embodiments, the elements 710a-d may include or be made of dielectric materials with a refractive index greater than 2 (n≥2). The resonator elements 710a-d may be within the transparency window of the switchable material or liquid crystal. The elements 710a-d may include materials such as titanium dioxide ($TiO_2$), silicon nitride (SiN), gallium nitride (GaN), gallium phosphide (GaP, for visible light), indium phosphide (InP), indium antimonide (InSb), silicon (Si), germanium (Ge, for near-infrared light) and/or other group IV and/or III-V semiconductors transparent at the wavelength of interest).

In various other embodiments, the resonator elements 710a-d may include or be made of a plasmonic material, such as gold (Au), silver (Ag), aluminum (Al), and/or any other suitable materials. The elements 710a-d may support single or multiple resonances, and be arranged periodically (in hexagonal, honeycomb, triangular or some other lattices) or aperiodically.

The resonator elements or particles may be of sub-wavelength dimensions. The sub-wavelength elements or particles may be configured or designed to be resonant near the frequency of interest, in which wave front manipulation is desired. In other words, the resonator elements or particles may be configured to be resonant within a predetermined range of the wavelength of the electromagnetic wave. The resonator elements or particles may provide a phase shift around the resonances (e.g. phase shift of π radians for elements or particles supporting a single resonance, phase shift of 2π radians for elements or particles supporting two resonances). In other words, the resonator elements or particles may cause a phase shift of up to π radians of the electromagnetic wave having an operating wavelength within a predetermined range of the electric resonance or the magnetic resonance of the elements or particles. The elements or particles may cause a phase shift of up to 2π radians of the electromagnetic wave having an operating wavelength within a predetermined range of the electric resonance and the magnetic resonance if the electric resonance and the magnetic resonance coincide or overlap each other.

The elements or particles may be configured or designed in such a way that the refractive index change of the liquid crystal layer, e.g. through re-orientation of the liquid crystals, and the consequent displacement of the resonances may result in different phase accumulation at the working frequency or wavelength of the electromagnetic wave for different states of the liquid crystal layer. Moreover, the phase accumulation provided by the resonance may add to the phase accumulation that is provided by the liquid crystal in the absence of elements or particles.

In various embodiments, the elements or particles may be plasmonic particles or high-index dielectric sub-wavelength particles. Dielectric particles may be preferable in many applications due their unique property to support both electric and magnetic resonances and their lower dissipation losses as compared to plasmonic particles. The magnetic (dipolar) resonant wavelength λ for spherical dielectric particles at a wavelength λ may fulfill approximately the following equation $$\lambda = n \cdot D \quad (5)$$

where n is the refractive index of the dielectric and D is the diameter of the sphere.

By changing the shape of the elements or particles (and consequently the aspect ratio of the elements or particles), it may be possible to spectrally shift the electric and magnetic (dipolar) resonances so that the electric and magnetic (dipolar) resonances overlap, thereby providing up to a total 2π radians phase shift. Moreover, in such a situation, the scattering of the electromagnetic wave in the backward direction may be inhibited if the induced electric and magnetic dipoles have the same amplitude and phases. This property may be used to realize directional antennas and reflection-less arrays (metasurfaces).

Figure 8A:
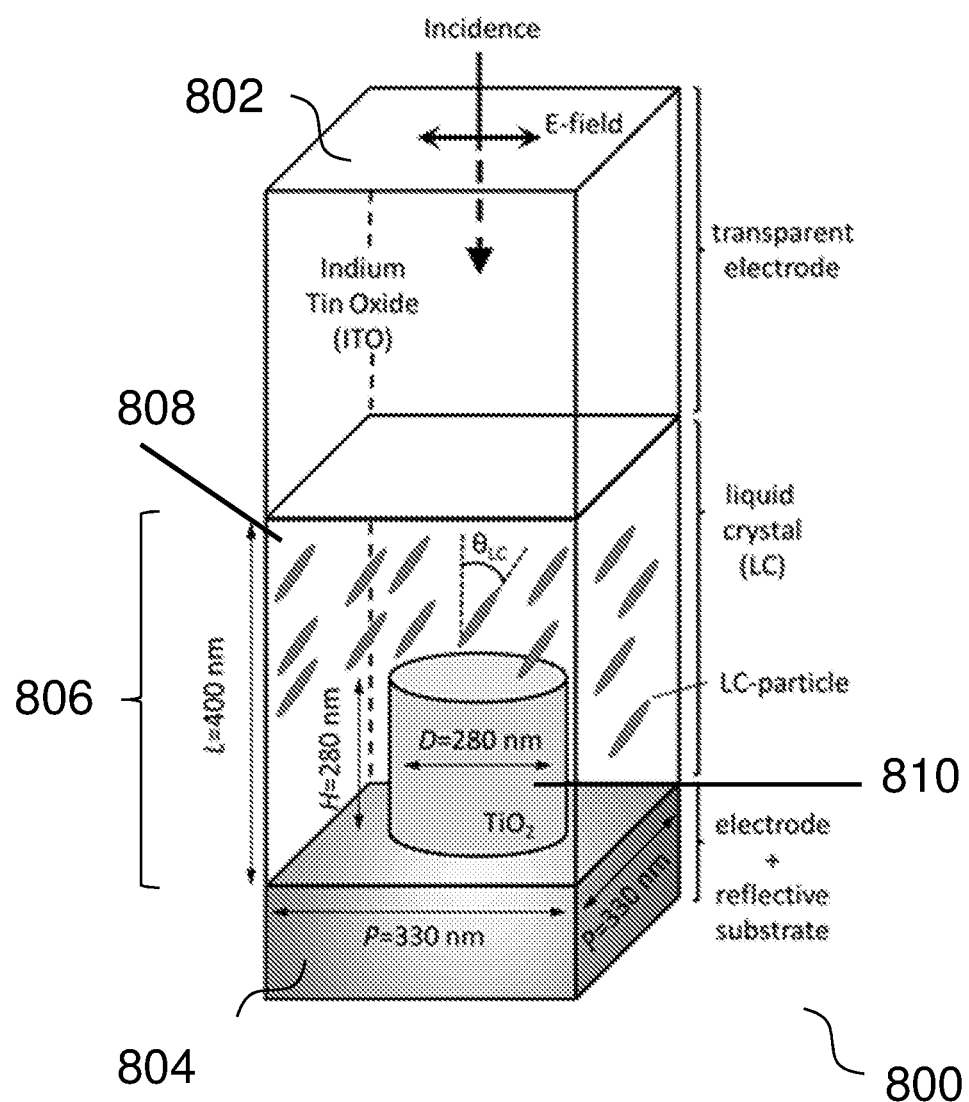
FIG. 8A is a perspective view of a portion of the device according to various embodiments.

FIG. 8A is a perspective view of a portion of the device 800 according to various embodiments. The device 800 may include a top electrode 802 including indium tin oxide (ITO) and a reflective substrate 804 including a bottom electrode. The device 800 may further include a matrix layer 806 between the top electrode 802 and the substrate 804. The matrix layer 806 may be a liquid crystal (LC) layer 808 with a plurality of titanium dioxide ($TiO_2$) resonant nanodisks 810. For the sake of clarity, only a portion of the device 800 with one nanodisk 810 is shown in FIG. 8A. The nanodisks may be located within the LC matrix 808 on the substrate side. The cylinders 810 may have diameters (D) of about 280 nm and heights (H) of about 280 nm, and may be arranged in a square lattice with period (P) of about 330 nm. The embedding LC layer has a thickness (L) of about 400 nm. The top electrode 802, the substrate 804, and the matrix layer 806 may form a stacked arrangement.

It may also be envisioned that the particles 810 may be of other shapes such as parallelepipeds, prisms, ellipsoids, etc. Further, the particles may be arranged in an array of a different geometry such as a hexagon, a honeycomb, a triangle, etc.

Figure 8B:
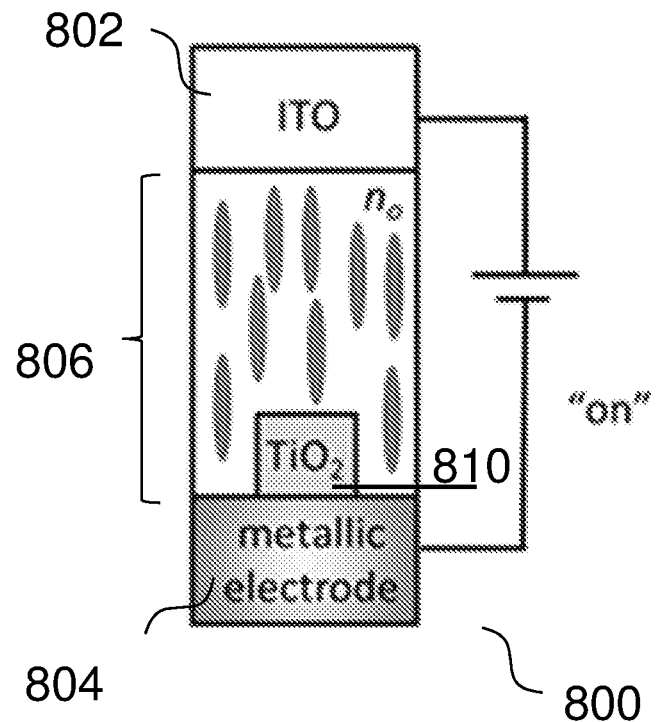
FIG. 8B is a cross-sectional side view of the portion of the device according to various embodiments when the device is in the "on" state.
Figure 8C:
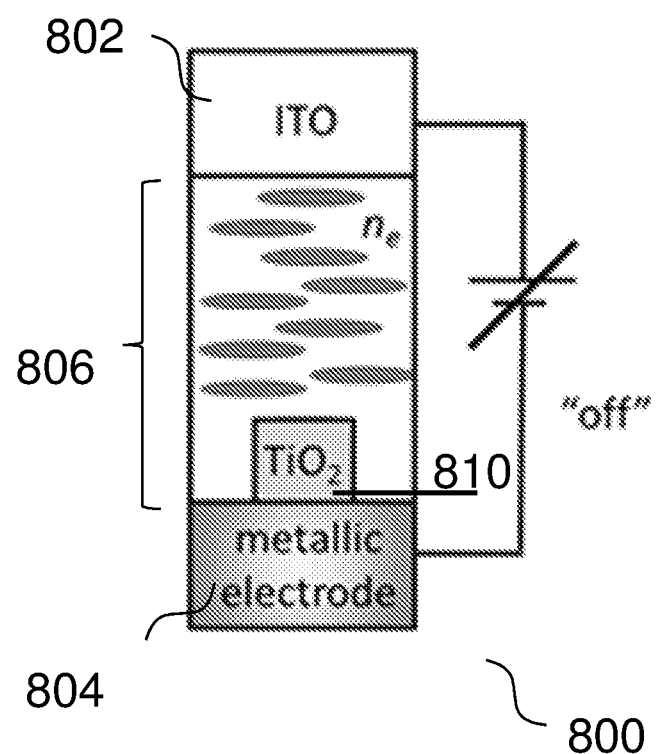
FIG. 8C is a cross-sectional side view of the portion of the device according to various embodiments when the device is in the "off" state.

FIG. 8B is a cross-sectional side view of the portion of the device 800 according to various embodiments when the device 800 is in the "on" state. FIG. 8C is a cross-sectional side view of the portion of the device 800 according to various embodiments when the device 800 is in the "off" state.

When the device 800 is in the "on" state, the LC particles may be oriented perpendicular to the substrate 804 and to the electric field of the normally incident electromagnetic wave. The LC layer 808 may have an index of refraction of $n_o$ (the "ordinary" refractive index of the LC layer 808), which may be experienced by the electromagnetic wave.

Figure 8D:
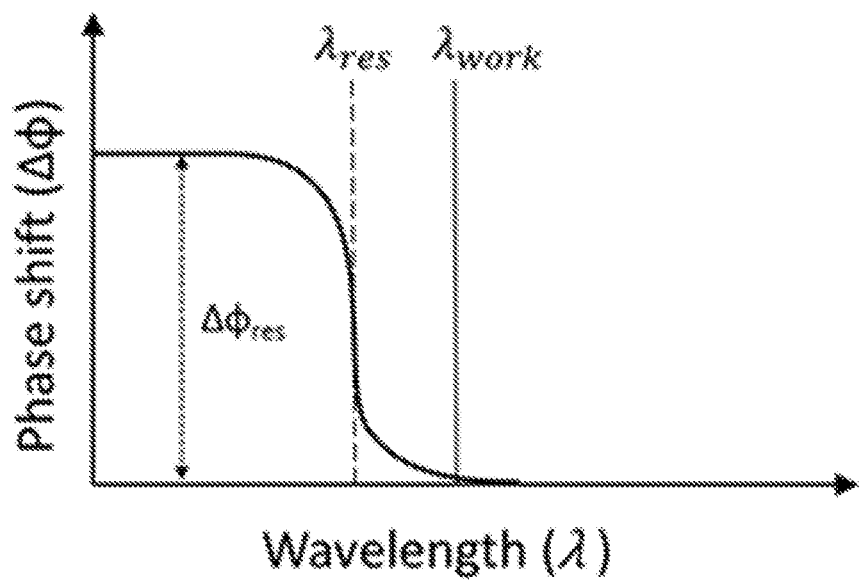
FIG. 8D is a plot of phase shift ($\Delta\phi$) as a function of wavelength ($\lambda$) when the device is in the "on" state according to various embodiments.

The electromagnetic wave may excite electric dipolar resonance in the $TiO_2$ particles 810. FIG. 8D is a plot 812 of phase shift ($\Delta\phi$) as a function of wavelength ($\lambda$) when the device 800 is in the "on" state according to various embodiments. The resonant wavelength may be represented by $\lambda_{res}$ while the operating wavelength (i.e. wavelength of the electromagnetic wave) may be represented by $\lambda_{work}$. The resonance or resonances of the particles 810 may be excited at a resonant wavelength $\lambda_{res}$ shorter than the operating wavelength $\lambda_{work}$ to induce a phase shift $\Delta\phi_{res}$.

When the system switches to the "off" state, the liquid crystals may be oriented parallel both to the substrate 804 and to the electric field of the incident wave. The LC layer 808 may have an index of refraction of $n_e$ (the "extraordinary" refractive index of the LC layer 808), which may be experienced by the electromagnetic wave.

Figure 8E:
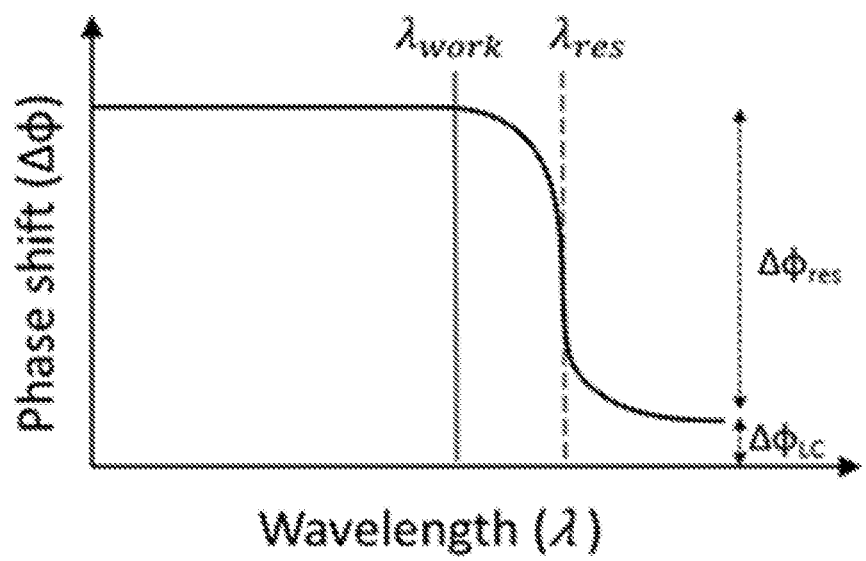
FIG. 8E is a plot of phase shift ($\Delta\phi$) as a function of wavelength ($\lambda$) when the device is in the "off" state according to various embodiments.

When the device 800 is in the "off" state, even in the absence of particles 810, the electromagnetic wave may experience a phase retardation of $\Delta\phi_{LC}$, as compared to when the device 800 is in the "on" state, which is the standard mechanism for phase modulation in LC-based SLMs. FIG. 8E is a plot 814 of phase shift ($\Delta\phi$) as a function of wavelength ($\lambda$) when the device 800 is in the "off" state according to various embodiments. As seen from FIG. 8E, introducing the particles 810 may generate an additional effect. Upon the change of the refractive index of the liquid crystal layer 808, the resonant wavelength $\lambda_{res}$ may be redshifted. The resonances or resonances of the particles 810 may be excited at a longer wavelength $\lambda_{res}$ than the operating wavelength $\lambda_{work}$, as shown in FIG. 8E. As a consequence, at the operating wavelength, the phase accumulated may be the sum of the phase shift induced by the LC ($\Delta\phi_{LC}$) and the phase shift induced by the resonance or resonances in the $TiO_2$ nanodisks ($\Delta\phi_{res}$).

The resonant particles 810 may enhance the phase accumulation in the device 800 induced by the change in the refractive index of the liquid crystal. As a consequence, the same amount of phase may be accumulated with a thinner liquid crystal (LC) layer 808.

The performance of the device according to various embodiments may be demonstrated by means of full numerical simulations based on the Finite Differences Time Domain (FDTD, Lumerical Solutions). Values of the refractive index of $TiO_2$ may be measured by ellipsometry, which closely coincide with those reported in the literature. Refractive index of ITO may be based on measured values reported in König, T. A. F. et al. *"Electrically tunable plasmonic behavior of nanocube-polymer nanomaterials induced by a redox-active electrochromic polymer"*, ACS Nano 8, 6182-6192 (2014). The anisotropic refractive index values of the liquid crystal may be taken from commercially available LC (LC E7 by Merck), and may be fully taken into account in the simulation through a permittivity tensor.

For the purpose of characterization of the performance, the phase-shift accumulation in devices with and without the $TiO_2$ nanodisks may be compared. In both cases, the orientation of the liquid crystals may be changed and the phase accumulation may be measured.

Figure 9A:
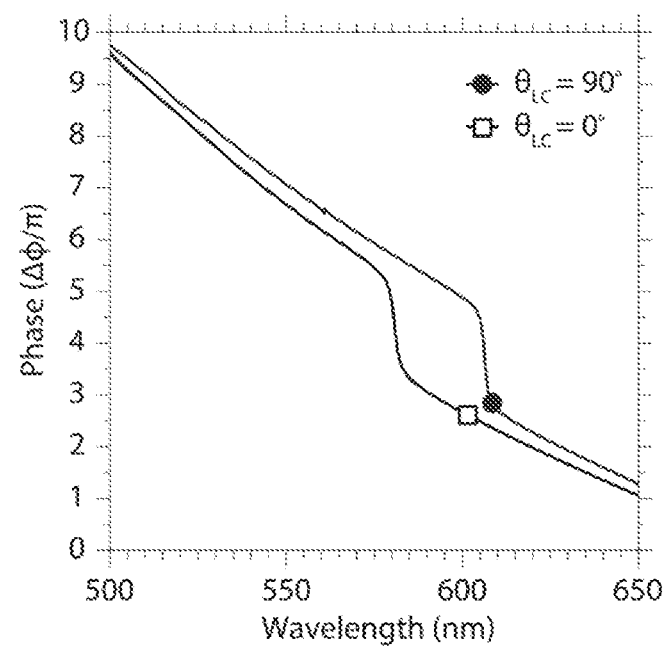
FIG. 9A is a plot of phase as a function of wavelength (nanometer or nm) showing the phase shift of an electromagnetic wave transmitted through a device including liquid crystals and titanium dioxide ($TiO_2$) nanodisks according to various embodiments when the device is switch from the "on" state to the "off" state.
Figure 9B:
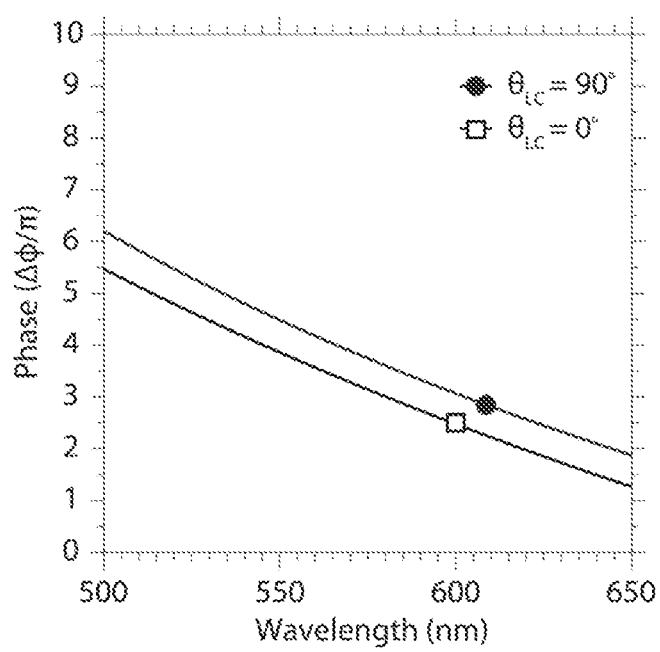
FIG. 9B is a plot of phase as a function of wavelength (nanometer or nm) showing the phase shift of an electromagnetic wave transmitted through a device including liquid crystals (without the titanium dioxide ($TiO_2$) nanodisks) when the device is switch from the "on" state to the "off" state.

FIG. 9A is a plot 900a of phase as a function of wavelength (nanometer or nm) showing the phase shift of an electromagnetic wave transmitted through a device including liquid crystals and titanium oxide ($TiO_2$) nanodisks according to various embodiments when the device is switch from the "on" state to the "off" state. FIG. 9B is a plot 900b of phase as a function of wavelength (nanometer or nm) showing the phase shift of an electromagnetic wave transmitted through a device including liquid crystals (without the titanium oxide ($TiO_2$) nanodisks) when the device is switch from the "on" state to the "off" state.

In both cases as shown in plots 900a, 900b, the liquid crystals may be oriented so that their longitudinal axis are perpendicular to the substrate and to the electric field of the incident wave when the device is in the "on" state ($\theta_{LC}=0°$), while the liquid crystals may be oriented so that their longitudinal axis are parallel to the substrate and the electric field when the device is in the "off" state ($\theta_{LC}=90°$). The simulation results show that more than a radians phase accumulation may be achieved in the device including the liquid crystals and the $TiO_2$ nanodisks. Meanwhile, for the device without the $TiO_2$ nanodisks (i.e. the device having the bare LC matrix), a phase accumulation around 0.6n radians may be obtained. Based on the difference in the refractive index in the two orientations, a total thickness of about 1.5 µm may be required to accumulate the desired phase difference of $2\pi$ in the bare LC matrix. It may be possible to reduce the thickness of the LC matrix by about 4 times with the inclusion of the nanodisks in the LC matrix.

In various embodiments, the resonance induced may not be sufficient to cause a $2\pi$ radians phase shift. However, any phase accumulation provided by the resonance(s) may be beneficial in terms of thickness reduction. Thus, the inclusion of the elements or particles may still be useful even if the resonance(s) of the elements or particles do not accumulate enough phase as to achieve the full $2\pi$ phase modulation on their own. Various embodiments may circumvent a critical problem encountered in attempts to design purely particle-based spatial light modulators, i.e. the difficulty of achieving full 2π radians phase modulation. This difficulty may arise due to fabrication defects, periodicity breaking (which may tend to broaden the resonances), and/or insufficient resonance shifts. In functional devices, the periodicity of the array of particles (which may tend to narrow the resonances and which may facilitate the 2π phase modulation) may be broken or disrupted because different pixels are addressed individually. Various embodiments which involve addition of the phase accumulation arising from the liquid crystal layer and arising from the resonant particles may address this issue, while allowing a substantial reduction of the thickness, leading to pixel miniaturization.

This example shows that a specific design based on a square arrangement of similar, resonant $TiO_2$ nanoparticles embedded in the LC matrix in the side of the reflective substrate may be used to enhance the phase accumulation upon change of the LC orientation, thus reducing the required LC thickness to achieve full 2π modulation.

Figure 10A:
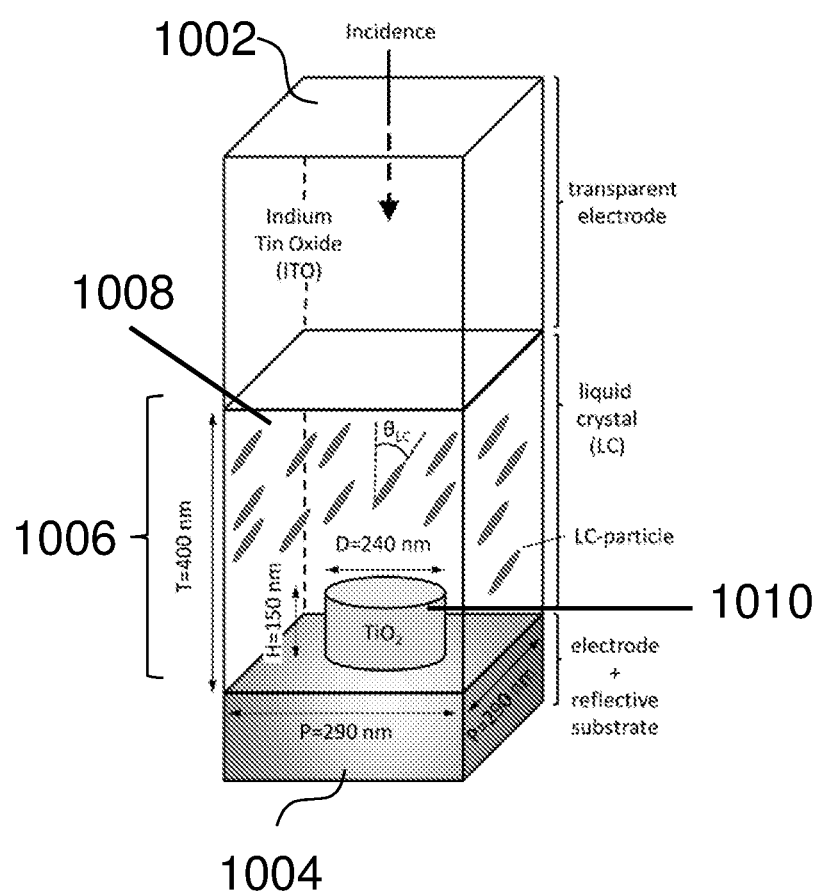
FIG. 10A is a perspective view of a portion of the device according to various embodiments.

FIG. 10A is a perspective view of a portion of the device 1000 according to various embodiments. The device 1000 may be similar to the device 800 shown in FIG. 8A, but may have different dimensions of the elements and array periodicity. The device 1000 may include a top electrode 1002 including indium tin oxide (ITO) and a reflective substrate 1004 including a bottom electrode. The device 1000 may further include a matrix layer 1006 between the top electrode 1002 and the substrate 1004. The matrix layer 1006 may be a liquid crystal (LC) layer 1008 with a plurality of titanium oxide ($TiO_2$) resonant nanodisks 1010. For the sake of clarity, only a portion of the device 1000 with one nanodisk 1010 is shown in FIG. 10A. The nanodisks may be located within the LC matrix 1008 on the substrate side. The cylinders 1010 may have diameters (D) of about 240 nm and heights (H) of about 150 nm, and may be arranged in a square lattice with period (P) of about 290 nm. The embedding LC layer has a thickness (L) of about 400 nm. The top electrode 1002, the substrate 1004, and the matrix layer 1006 may form a stacked arrangement.

Figure 10B:
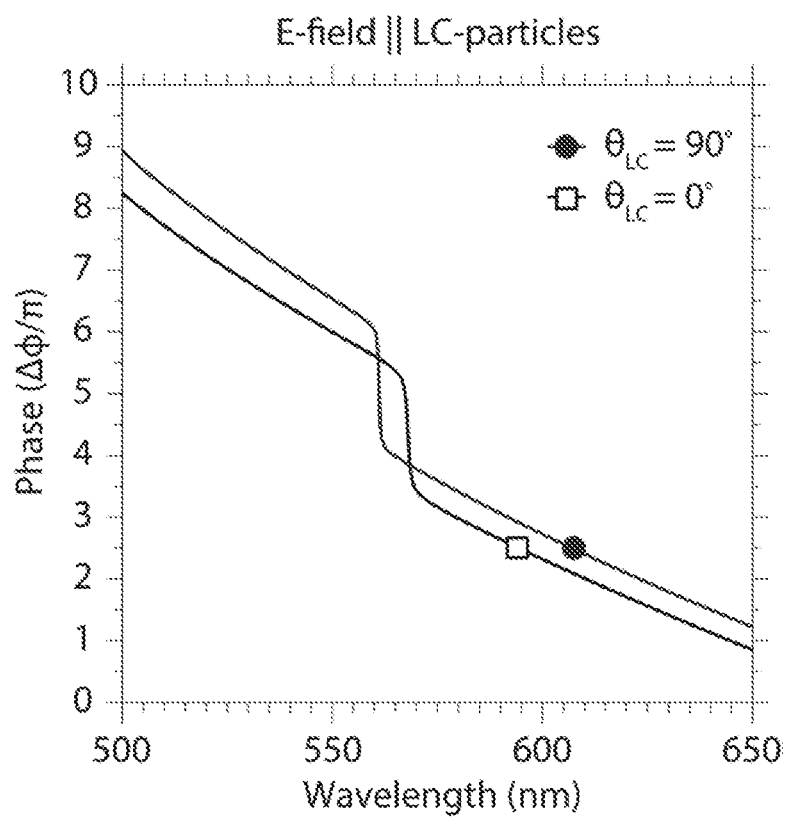
FIG. 10B is a plot of phase shift ($\Delta\phi$) as a function of wavelength ($\lambda$) showing the phase shift of the electromagnetic wave when the device is in the "off" state and when the device is in the "on" state according to various embodiments.

The performance of the device 1000 may be demonstrated by means of full numerical simulations based on FDTD. FIG. 10B is a plot 1012 of phase shift (A) as a function of wavelength (λ) showing the phase shift of the electromagnetic wave when the device 1000 is in the "off" state and when the device 1000 is in the "on" state according to various embodiments.

FIGS. 10A-B highlight that the choice of the particle dimensions/geometry may be important in order to obtain the desired additive effect of the phase accumulation induced by the switching of the liquid crystal and the phase accumulation induced by the resonances in the elements or particles. Simulation results show that, the lowest energy resonance of the elements or particles may occur at around $\lambda_{res}$=570 nm when the system is in the "on" state, as evidenced by the abrupt change in phase accumulation shown in FIG. 10B. Contrary to the data for device 800, this resonance may be the magnetic dipole resonance. When the device 1000 is switched "off", the resonance may blue-shift, which is contrary to that shown for device 800. There may be a negative effect in terms of the total phase modulation, since the phase accumulation induced by the switching of the LC and the phase accumulation induced by the resonance may not add. Importantly, this effect may not be compensated by increasing the thickness of the liquid crystal layer. In fact, the effect due to the elements may worsen the situation. The resonant elements may thus be of no use in causing a phase shift of the electromagnetic wave. Finally, situations such as possible fabrication defects or periodicity breaking may further lead to a broadening of the resonances. Therefore, the particle design shown in FIG. 10A may not be adequate to obtain the desired effect.

FIGS. 10A-B show that not all designs including particles providing resonances may lead to the desired effect of adding to the phase accumulation induced by the switching of the switchable material.

It may be possible to use an additional layer of resonant particles at the superstrate side to further increase the phase accumulation as shown in FIG. 7C if a greater reduction of thickness is desired. The additional layer of resonant particles may further provide additional phase accumulation effect, and may not need to align with the layer of resonant particles at the substrate, as the phase accumulation may occur independently from one another. This may facilitate the fabrication processes.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A device for controlling an electromagnetic wave, the device comprising:
 a first electrode layer;
 a second electrode layer; and
 a matrix layer between the first electrode layer and the second electrode layer, the matrix layer comprising:
  a liquid crystal layer; and
  a resonator element, the resonator element being a nanostructure consisting of a dielectric material, a Group IV semiconductor material, or a Group III Group V semiconductor material, the resonator element in contact with the liquid crystal layer;
 wherein the liquid crystal layer is configured to switch, at least, from a first state to a second state in response to a voltage applied between the first electrode layer and the second electrode layer, the resonator element configured to act as an antenna and further configured to provide a phase accumulation, due to a magnetic dipole resonance and an electric dipole resonance excited within the resonator element, that adds to a phase accumulation due to the switching of the liquid crystal layer, thereby changing an optical property of the matrix layer to control the electromagnetic wave received by the matrix layer.

2. The device according to claim 1, wherein the first electrode is transparent.

3. The device according to claim 1, wherein the first electrode comprises indium tin oxide.

4. The device according to claim 1, wherein the second electrode is configured to reflect the electromagnetic waves incident on the second electrode.

5. The device according to claim 1, wherein the second electrode comprises a metal.

6. The device according to claim 1, wherein the liquid crystal layer configured to switch from a first state to a second state comprises orientating liquid crystals comprised in the liquid crystal layer from a first direction to a second direction different from the first direction.

7. The device according to claim 1, wherein the matrix layer further comprises further resonator elements to form an array of resonator elements.

8. The device according to claim 7, wherein the array is an aperiodic array.

9. The device according to claim 7, wherein the array is a periodic array.

10. The device according to claim 1, wherein the resonator element is nearer to the first electrode compared to the second electrode.

11. The device according to claim 1, wherein the resonator element is nearer to the second electrode compared to the first electrode.

12. The device according to claim 1, wherein the resonator element is nearer to the first electrode compared to the second electrode, and wherein the matrix layer further comprises a further resonator element nearer to the second electrode compared to the first electrode.

13. The device according to claim 1, wherein the resonator element is a nanocylinder, a nanodisk, a nano-parallelepiped, a nano-prism, or a nano-ellipsoid.

14. The device according to claim 1, wherein a refractive index of the dielectric material is greater than 2.

15. An arrangement comprising:
a device for controlling an electromagnetic wave, the device comprising:
a first electrode layer;
a second electrode layer; and
a matrix layer between the first electrode layer and the second electrode layer, the matrix layer comprising:
a liquid crystal layer; and
a resonator element, the resonator element being a nanostructure consisting of a dielectric material, a Group IV semiconductor material or a Group III Group V semiconductor material, the resonator element in contact with the liquid crystal layer;
wherein the liquid crystal layer is configured to switch from, at least, a first state to a second state in response to a voltage applied between the first electrode layer and the second electrode layer, the resonator element configured to act as an antenna and further configured to provide a phase accumulation, due to a magnetic dipole resonance and an electric dipole resonance excited within the resonator element, that adds to a phase accumulation due to the switching of the liquid crystal layer, thereby changing an optical property of the matrix layer to control the electromagnetic wave received by the matrix layer; and an electromagnetic wave source configured to emit the electromagnetic wave.

16. The arrangement according to claim 15, wherein the resonator element is of subwavelength dimensions.

17. A method of operating a device to control an electromagnetic wave, the method comprising:
providing the electromagnetic wave to a device, the device comprising:
a first electrode layer;
a second electrode layer; and
a matrix layer between the first electrode layer and the second electrode layer, the matrix layer comprising:
a liquid crystal layer; and
a resonator element, the resonator element being a nanostructure consisting of a dielectric material, a Group IV semiconductor material or a Group III-Group V semiconductor material, the resonator element in contact with the liquid crystal layer; and
applying a voltage between the first electrode layer and the second electrode layer so that the liquid crystal layer switches from, at least, a first state to a second state in response to the voltage applied to control the electromagnetic wave received by the matrix layer;
wherein the resonator element is configured to act as an antenna and is further configured to provide a phase accumulation, due to a magnetic dipole resonance and an electric dipole resonance, that adds to a phase accumulation due to the switching of the liquid crystal layer.

18. The method according to claim 17, wherein controlling the electromagnetic wave comprises inducing a phase shift of the electromagnetic wave of a value selected from a range of 0 radian to $2\pi$ radians.

19. The method according to claim 17, wherein the liquid crystal layer comprise liquid crystals; wherein the liquid crystals are oriented in a direction perpendicular to an electric field of the electromagnetic wave when the liquid crystal layer is in the first state; and wherein the liquid crystals are oriented in a direction parallel to the electric field of the electromagnetic wave when the liquid crystal layer is in the second state.

20. The method according to claim 17, wherein the magnetic dipole resonance and the electric dipole resonance of the at least one resonator element is changed by applying the voltage between the first electrode layer and the second electrode layer.

* * * * *